(12) United States Patent
Hsieh et al.

(10) Patent No.: US 12,131,496 B2
(45) Date of Patent: Oct. 29, 2024

(54) METHOD AND SYSTEM FOR OBJECT IDENTIFICATION

(71) Applicant: Chiun Mai Communication Systems, Inc., New Taipei (TW)

(72) Inventors: Tung-Chun Hsieh, New Taipei (TW); Chung-Wei Wu, New Taipei (TW); Sung-Chuan Lee, New Taipei (TW); Chien-Ming Ko, New Taipei (TW); Tze-Chin Lo, New Taipei (TW); Chih-Wei Li, New Taipei (TW); Hsin-Ko Yu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 355 days.

(21) Appl. No.: 17/860,320

(22) Filed: Jul. 8, 2022

(65) Prior Publication Data

US 2023/0007960 A1   Jan. 12, 2023

(30) Foreign Application Priority Data

Jul. 9, 2021   (CN) .......................... 202110777981.0

(51) Int. Cl.
  *G06T 7/70*   (2017.01)
  *B25J 13/08*   (2006.01)
  *G06T 7/50*   (2017.01)

(52) U.S. Cl.
  CPC .............. *G06T 7/70* (2017.01); *B25J 13/08* (2013.01); *G06T 7/50* (2017.01); *G06T 2207/10028* (2013.01)

(58) Field of Classification Search
  CPC ... G06T 7/70; G06T 7/50; G06T 2207/10028; G06T 7/0004; G06T 2207/10016; B25J 13/08; B25J 9/1612; B25J 9/1697; G05B 2219/39484; Y02P 90/30
  USPC .......................................................... 382/291
  See application file for complete search history.

(56) References Cited

U.S. PATENT DOCUMENTS

| | | | | |
|---|---|---|---|---|
| 10,751,871 | B2* | 8/2020 | Ono | B25J 9/1682 |
| 11,597,078 | B2* | 3/2023 | Yang | G06V 40/107 |
| 11,645,778 | B2* | 5/2023 | Min | G06F 18/28 |
| | | | | 382/152 |
| 11,787,631 | B2* | 10/2023 | Deacon | B62J 27/00 |
| | | | | 700/218 |
| 11,845,194 | B2* | 12/2023 | Yamazaki | B25J 15/08 |

(Continued)

FOREIGN PATENT DOCUMENTS

| | | | |
|---|---|---|---|
| CN | 111932625 A | | 11/2020 |
| CN | 112802107 A | * | 5/2021 |

(Continued)

*Primary Examiner* — Mahendra R Patel
(74) *Attorney, Agent, or Firm* — ScienBiziP, P.C.

(57) ABSTRACT

A method for identifying objects by shape in close proximity to other objects of different shapes obtains point cloud information of multiple objects. The objects are arranged in at least two trays and the trays are stacked. A depth image of the objects is obtained according to the point cloud information, and the depth image of the objects is separated and layered to obtain a layer information of all the objects. An object identification system also disclosed. Three-dimensional machine vision is utilized in identifying the objects, improving the accuracy of object identification, and enabling the mechanical arm to accurately grasp the required object.

18 Claims, 8 Drawing Sheets

(56) References Cited

U.S. PATENT DOCUMENTS

| | | | |
|---|---|---|---|
| 11,922,368 B1 * | 3/2024 | Wozniak | G06N 20/20 |
| 12,067,746 B2 * | 8/2024 | Taamazyan | G06T 7/55 |
| 2016/0224858 A1 * | 8/2016 | Chen | G06V 20/64 |
| 2018/0089903 A1 * | 3/2018 | Pang | H04N 23/45 |
| 2019/0108396 A1 * | 4/2019 | Dal Mutto | G06V 20/52 |
| 2020/0014940 A1 * | 1/2020 | Dawar | G06T 9/001 |
| 2020/0210680 A1 * | 7/2020 | Shreve | G06V 10/757 |
| 2021/0138655 A1 * | 5/2021 | Mousavian | B25J 9/161 |
| 2022/0012504 A1 * | 1/2022 | Liu | G06T 7/50 |
| 2022/0026920 A1 * | 1/2022 | Ebrahimi Afrouzi | G06N 7/01 |
| 2022/0375125 A1 * | 11/2022 | Taamazyan | G06T 7/269 |
| 2022/0383538 A1 * | 12/2022 | Tang | G06T 7/73 |

FOREIGN PATENT DOCUMENTS

| | | | | |
|---|---|---|---|---|
| EP | 3772701 A1 * | 2/2021 | | G06T 7/0002 |
| JP | 2014205209 A * | 10/2014 | | |
| TW | I576221 B | 4/2017 | | |
| WO | WO-2020009806 A1 * | 1/2020 | | G06K 9/00805 |
| WO | WO-2021187316 A1 * | 9/2021 | | |

* cited by examiner

METHOD AND SYSTEM FOR OBJECT IDENTIFICATION

TECHNICAL FIELD

The present disclosure relates to the field of robotics, in particular to method and system for object identification.

BACKGROUND

In customized production, a manipulator needs to identify the shape of one component among several different components to pick up the correct component. At present, in related technologies, a mechanical arm identifies the components through two-dimensional machine vision. Complex components may be involved in customized production processes and stacking components makes identification more difficult. As result, there may be mis-identification of the components using two-dimensional machine vision.

Therefore, improvement is desired.

DETAILED DESCRIPTION

The technical solutions in the embodiments of the present disclosure will be described in conjunction with the accompanying drawings in the embodiments of the present disclosure. Obviously, the described embodiments are part of the embodiments of the present disclosure, not all of them. Based on the embodiments of the present disclosure, all other embodiments obtained by those of ordinary skill in the art without creative work shall fall within the protection scope of the present disclosure.

It should be noted that "at least one" in the embodiment of the present disclosure refers to one or more, and multiple refers to two or more. For example, the terms "first", "second", "third", "fourth" in the description, claims and drawings of the application are used to distinguish similar objects, rather than to describe a specific order.

It should be noted that in the embodiment of the present disclosure, "first", "second" and other words are only used for the purpose of distinguishing description and cannot be understood as indicating or implying relative importance, or as indicating or implying order. The features defined as "first" and "second" may include one or more of the features explicitly or implicitly. In the description of the embodiments of the present disclosure, the words "exemplary" or "for example" are used as examples, examples or explanations. Any embodiment or design described as "exemplary" or "for example" in the embodiments of the present disclosure shall not be interpreted as more preferred or advantageous than other embodiments or designs. Specifically, the use of the words "exemplary" or "for example" is intended to present the relevant concepts in a specific way.

In customized production, required components may all be different in shape, the manipulator needs to identify the shape of the components to pick up the correct component.

At present, in related technologies, the components are identified by two-dimensional machine vision. Due to the complexity of parts involved in customized production, the components may be stacked, and the pallets for the components in the factory are usually transparent. Therefore, when using the two-dimensional camera for image recognition, it may mistakenly identify the components of other layers, so that the manipulator fails to grasp the correct component, which may lead to error.

The object identification system and method provided by the embodiment of the present disclosure are described below in combination with the accompanying drawings.

Figure 1:
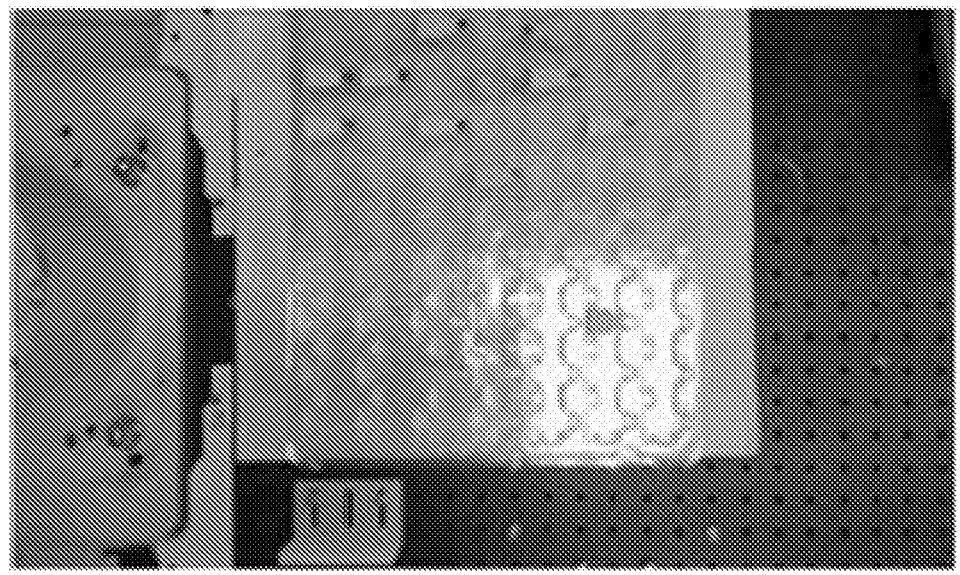
FIG. 1 is a two-dimensional image of objects awaiting selection in prior art.

FIG. 1 is an image of objects in two dimensions, in related technologies.

As shown in FIG. 1, the objects are placed on the trays and different trays are stacked in layers. When the tray is transparent, two-dimensional imaging is not optimal for identification, as objects in other layers being misidentified, resulting in the wrong object being selected by the mechanical arm.

Figure 2:
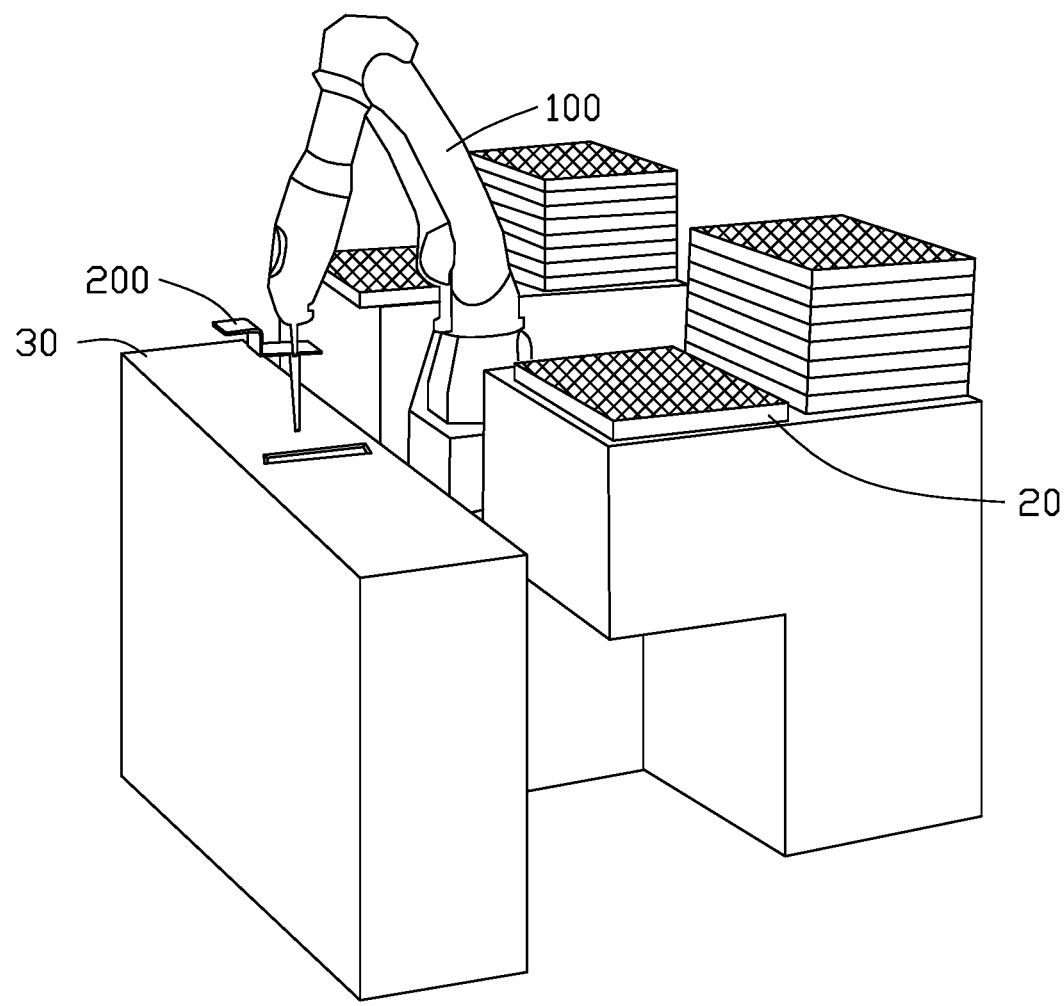
FIG. 2 is a schematic diagram of an object identification system according to an embodiment of the present disclosure.

FIG. 2 illustrates an object identification system 10 in accordance with an embodiment of the present disclosure.

As shown in FIG. 2, the object identification system 10 includes a mechanical arm 100 and a three-dimensional camera 200. The mechanical arm 100 is connected to the three-dimensional camera 200, a tray 20 and a production line 30 are also shown in FIG. 2.

In the embodiment of present disclosure, the mechanical arm 100 is fixedly connected to the three-dimensional camera 200, when the mechanical arm 100 moves above the tray 20, the three-dimensional camera 200 is moved synchronously above the tray 20. The tray 20 is used to accommodate the objects. The mechanical arm 100 is used to grab and move the objects from the tray 20 to the production line 30.

In the embodiment of present disclosure, the three-dimensional camera 200 includes a two-dimensional RADER, a three-dimensional RADER, a two-dimensional LiDAR, a three-dimensional LiDAR, a stereo camera, and a time-of-flight camera. The three-dimensional camera 200 is used to capture three-dimensional images.

In the embodiment of present disclosure, the placement of the objects of the tray 20 can be set at an angle of 180 degrees relative to an adjacent tray 20. In the present disclosure, the included angle of the objects between adjacent tray 20 is set at 180 degrees, so that the object identification system 10 can easily distinguish objects stacked in different layers.

In the embodiment of present disclosure, the objects in the object group can be different. The objects in the same tray 20 may be different. The object identification system 10 can control the mechanical arm 100 to grasp object from different trays 20.

Figure 3:
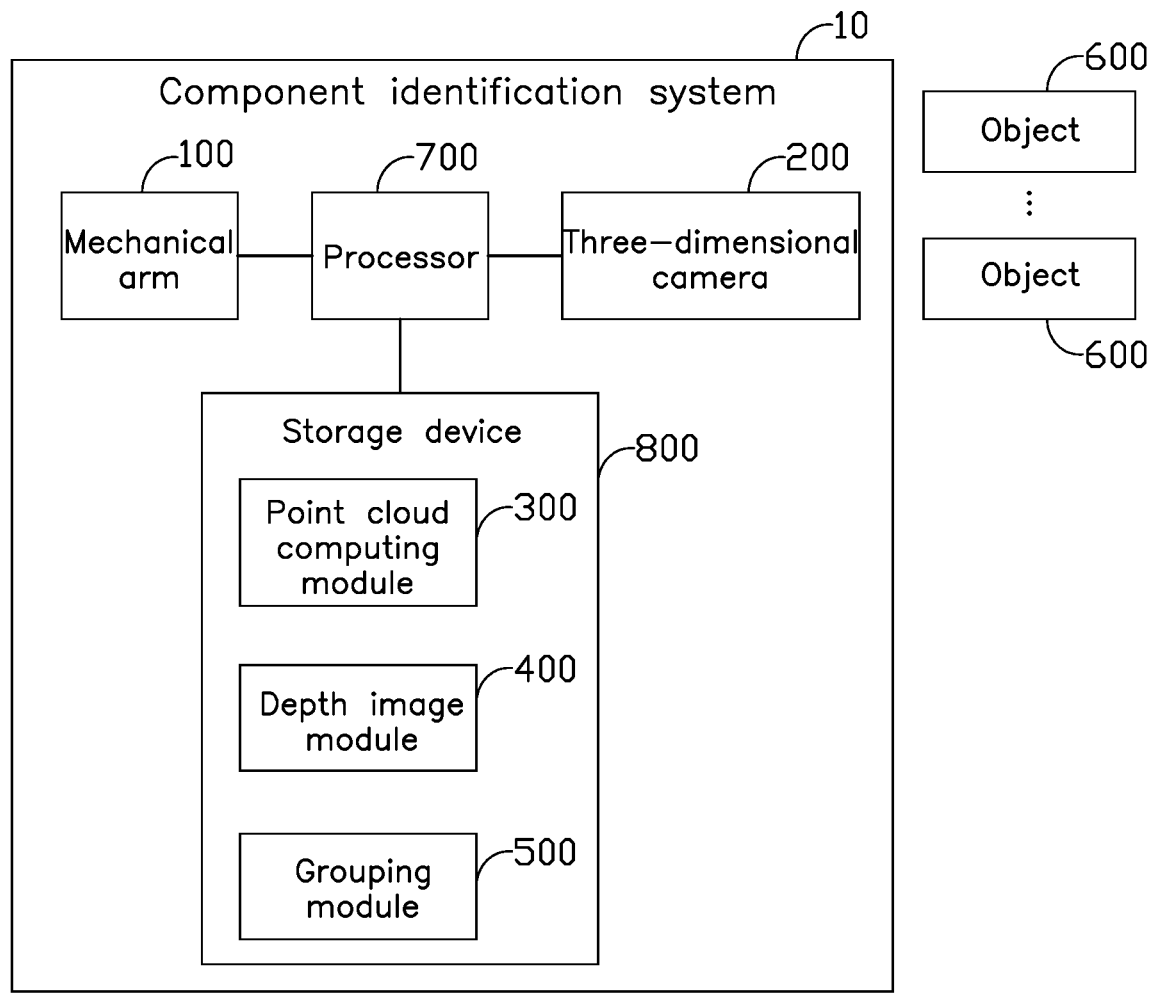
FIG. 3 is a schematic diagram of the object identification system according to another embodiment of the present disclosure.

FIG. 3 illustrates an object identification system 10 in accordance with another embodiment of the present disclosure.

As shown in FIG. 3, compared with FIG. 1, the object identification system 10 further includes a processor 700 and a storage device 800. The processor 700 is connected with the three-dimensional camera 200 and the mechanical arm 100. The storage device 800 can be used to store the program segment. The processor 700 operates or executes the program segment stored in the storage device 800 and calls up or recalls data stored in the storage device 800, and implements various functions of the object identification system 10. The storage device 800 may include a plurality of functional modules composed of program code segments. For example, in the embodiment, the storage device 800 includes a point cloud computing module 300, a depth image module 400, and a grouping module 500. The program code of each program segment stored in the storage device 800 can be executed by the processor 700 of the object identification system 10 to perform the object identification function. In other embodiment, the modules 300-500 may also be a program instruction or firmware that is embedded in the processor 700. The three-dimensional camera 200 is connected to the mechanical arm 100, the point cloud computing module 300 is connected to the three-dimensional camera 200, the depth image module 400 is connected to the point cloud computing module 300, the grouping module 500 is connected to the depth image module 400, and the mechanical arm 100 is connected to the grouping module 500. The storage device 800 may include, but not limited to, a RAM, and may also include non-volatile memory such as a hard disk, a memory, a plug-in hard disk, a smart memory card (SMC), and a Secure Digital (SD) card, a flash card, at least one disk storage device, flash device, or other volatile or non-volatile solid-state storage device. The processor 700 may be, but not limited to, a central processing unit (CPU), or may be other general purpose processor, a digital signal processor (DSP), an application specific integrated circuit (ASIC), a Field-Programmable gate array (FPGA) or other programmable logic device, a transistor logic device, or a discrete hardware component. The general purpose processor may be a microprocessor. The processor 700 may also be any conventional processor. The processor 700 is a control center of the object identification system 10.

In the embodiment of present disclosure, the three-dimensional camera 200 is connected to the mechanical arm 100. The three-dimensional camera 200 is moved with the mechanical arm 100 to adjust the position and angle of the three-dimensional camera 200 when shooting. The connection mode between the three-dimensional camera 200 and the mechanical arm 100 can be fixed or movable within a certain range, not limited here. The three-dimensional camera 200 is used to capture three-dimensional images of the objects 600. The three-dimensional image includes images of the objects 600 and other facilities on the production line 30.

The three-dimensional camera 200 first adjusts the position of the three-dimensional camera 200 before shooting the three-dimensional image of the objects 600, so that the three-dimensional camera 200 is as close as possible parallel to the objects, so as to reduce the computational complexity of subsequent position calculations.

In the embodiment of present disclosure, the point cloud computing module 300 is used to obtain the point cloud information of the objects 600 according to the three-dimensional image of the objects 600 captured by the three-dimensional camera 200. It is understandable that the point cloud computing module 300 may obtain the point cloud information of the plurality of objects 600 positioned in a same layer. The three-dimensional camera 200 first takes a three-dimensional reference photo, and the point cloud computing module 300 obtains the point cloud information of the objects 600 according to the reference photo. The point cloud information includes point cloud data. The point cloud data is a set of vectors in a three-dimensional coordinate system, and the point cloud information is all the point cloud data sets. The three-dimensional coordinate system includes (x, y, z, Rx, Ry, Rz) coordinates, where x, y, and z represent an x-axis, a y-axis and a z-axis coordinates respectively. Rx, Ry and Rz respectively represent the rotation angle of the objects 600 surrounding the x, y, and z axes, that is, the Euler angle. The point cloud computing module 300 outputs the point cloud information to the depth image module 400.

In the embodiment of present disclosure, the depth image module 400 is used to generate a depth image of the object 600 according to the point cloud information of the object. The depth image module 400 sorts the (x, y, z) coordinate points of all the objects, selects the point closest to the three-dimensional camera 200, sets that point as the reference point, and sets the z-axis value of the reference point as $Z_1$ to generate a reference point information. The depth image module 400 sets the reference point as the origin of the coordinate axis according to the reference point information and readjusts the coordinates in the point cloud information to form a depth image. The depth image module 400 transmits the depth image of the object and the reference point information to the grouping module 500.

Figure 7:
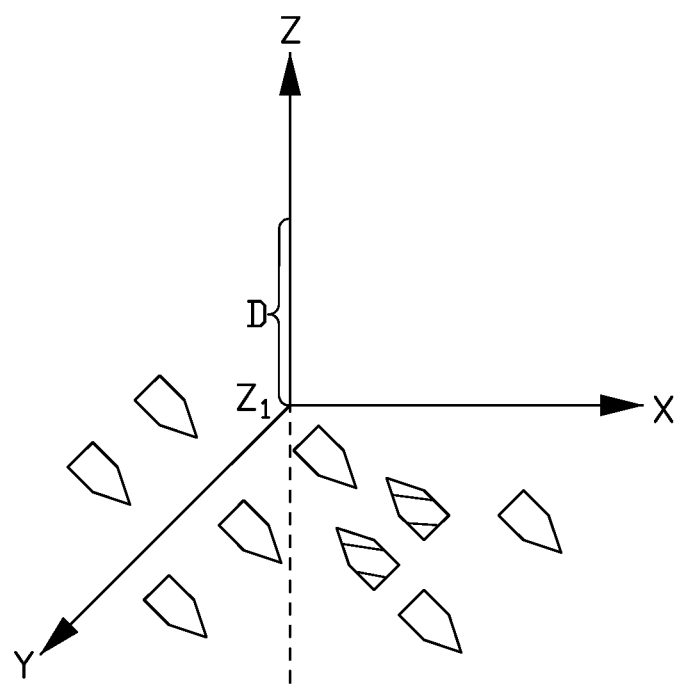
FIG. 7 is an image of grouped objects according to an embodiment of the present disclosure.

In the embodiment of present disclosure, referring to FIG. 7, the grouping module 500 is used to cut the depth image of the objects 600 into layers to obtain groupings of objects. The depth image module 400 first obtains the three-dimensional coordinates (x, y, z) of the objects. Then, the depth image module 400 sets the depth D according to the interval between the Z axes of the objects and the tray 20. It can be understood that in industrial production, the objects are usually placed on the tray 20, and stacking of different trays 20 is commonplace. Therefore, the setting of depth D can also be set according to the thickness of the tray 20 or the spacing between the trays 20.

Taking the z-axis value of the object as $Z_1$ as an example, the grouping module 500 selects the object with the z-axis value between [Z1, Z1+D] according to the depth image of the object 600, the information of the reference point, and the depth D. In one embodiment, the depth D can also be set according to the thickness of the tray 20 and the placement rules of the objects 600. For example, when the depth of the tray 20 is 50 cm, the depth D of the depth image can be set to 50 cm or 55 cm, but is not limited thereto. The grouping module 500 obtains all objects 600 with z-axis value between [Z1, Z1+D], and transmits the information of the objects to the mechanical arm 100.

In the embodiment of present disclosure, the mechanical arm 100 is used to grasp the objects 600 according to the objects grouping. The mechanical arm 100 may grasp the correct object based on a sorted order. After all objects have been lifted away, the mechanical arm 100 can move the tray 20 to one side to expose the objects on the next layer of the tray 20 and drive the three-dimensional camera 200 to a position parallel to the objects to start the next round of identifying and selecting objects.

Figure 4:
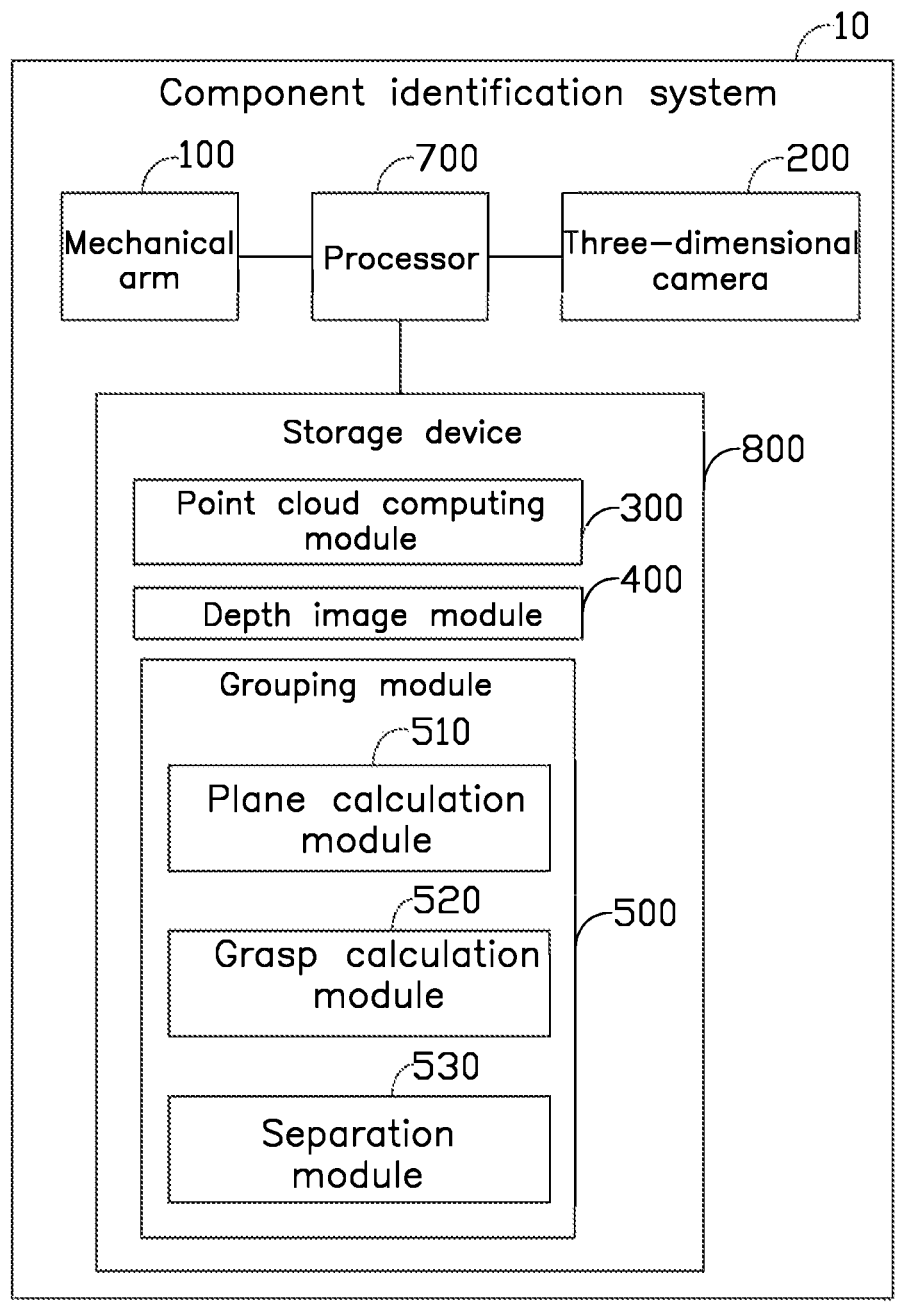
FIG. 4 is a schematic diagram of the component identification system according to another embodiment of the present disclosure.

FIG. 4 is a schematic diagram of the object identification system according to another embodiment of the present disclosure. Compared with FIG. 3, the grouping module 500 further includes a plane calculation module 510 and a grasp calculation module 520.

In the embodiment of present disclosure, the plane calculation module 510 is arranged inside the grouping module 500 to calculate the maximum plane of the object grouping according to the object grouping and Hesse normal formula. The maximum plane is the plane which contains the greatest number of objects 600.

In the embodiment of present disclosure, the plane calculation module 510 can apply the application programming interface (API) built in the point cloud library (PCL) for maximum plane calculation. The plane calculation module 510 first calculates the plane with the greatest z-axis value according to all objects with z-axis values between [Z1, Z1+D], so as to obtain a maximum plane.

The plane calculation module 510 establishes a new three-dimensional coordinate system according to the maximum plane, and sets the maximum plane coordinate values (x1, y1, z1) of the objects according to the new three-dimensional coordinate system. The plane calculation module 510 transmits the maximum plane coordinate values (x1, y1, z1) of the objects to the grasp calculation module 520.

In the embodiment of present disclosure, the grasp calculation module 520 calculates the maximum plane Euler angle (Rx1, RY1, RZ1) of the object according to the maximum plane coordinate values (x1, y1, z1) of the object and the normal vector of the maximum plane. The maximum plane coordinate values of the object and the maximum plane Euler angle of the object form a grasping point of the object. The grasp calculation module 520 transmits the grasping point of the object to the mechanical arm 100. The mechanical arm 100 adjusts the grasping angle according to the grasping point or points of the object (such as the maximum plane coordinate value and the maximum plane Euler angle of the objects) to improve the grasping accuracy of the mechanical arm 100.

Since a plurality of the objects may be contained in the tray 20, the plane of the tray 20 is not absolutely horizontal. Therefore, if the coordinates of the objects are calculated based on tray 20 being horizontal, there will be an error, resulting in error and grasping failure by the mechanical arm 100. Therefore, the present disclosure uses the plane calculation module 510 to calculate the maximum plane and calculates the grasping points of the objects according to the grasp calculation module 520, which allows the mechanical arm 100 to grasp the object more accurately. In one embodiment, the grasp calculation module 520 may calculate a grasping point of the each one of the plurality of objects according to a normal vector of the maximum plane, and the mechanical arm 100 may grasp the each one of the plurality of objects according to the grasping point of the each one of the plurality of objects.

In the embodiment of present disclosure, the grouping module 500 further includes a separation module 530. The separation module 530 is connected to the grasp calculation module 520 to obtain a curvature value of the objects in the depth image. The separation module 530 can sort the curvature values, distinguish the objects according to the point cloud size and curvature value corresponding to the objects, and separate images of the objects until all similar objects are separated. It can be understood that since the surface features of objects will bring different curvature changes, the objects and their contours can be found by matching according to the size and curvature features of the point cloud. It can be understood that the separated objects can be the same or different.

In the embodiment of present disclosure, after calculating the positions and contours of all objects, the grouping module 500 recalculates the plane center and normal vector of the average coordinate value of the objects grouped by the grouping module 500, and sends the plane center coordinate value and normal vector information to the mechanical arm 100 to move the mechanical arm 100 to the plane center.

When the tray 20 is made of transparent material and the objects are placed on the transparent tray 20, the transparent material of the tray 20 will magnify and create distortion, cause large errors after multiple calculations using the point cloud data in the depth image of the objects. Therefore, the grouping module 500 can also obtain the point cloud information from the three-dimensional camera 200, recalculate the object coordinate value according to the point cloud information, and perform the center calculation according to the object coordinate value. The center calculation is the center position of the object calculated according to the coordinate value of the object. The mechanical arm 100 adjusts a grasping angle of each one of the plurality of objects 60 positioned in a same layer according to the center position and Euler angle of the objects to grasp the object accurately.

Figure 5:
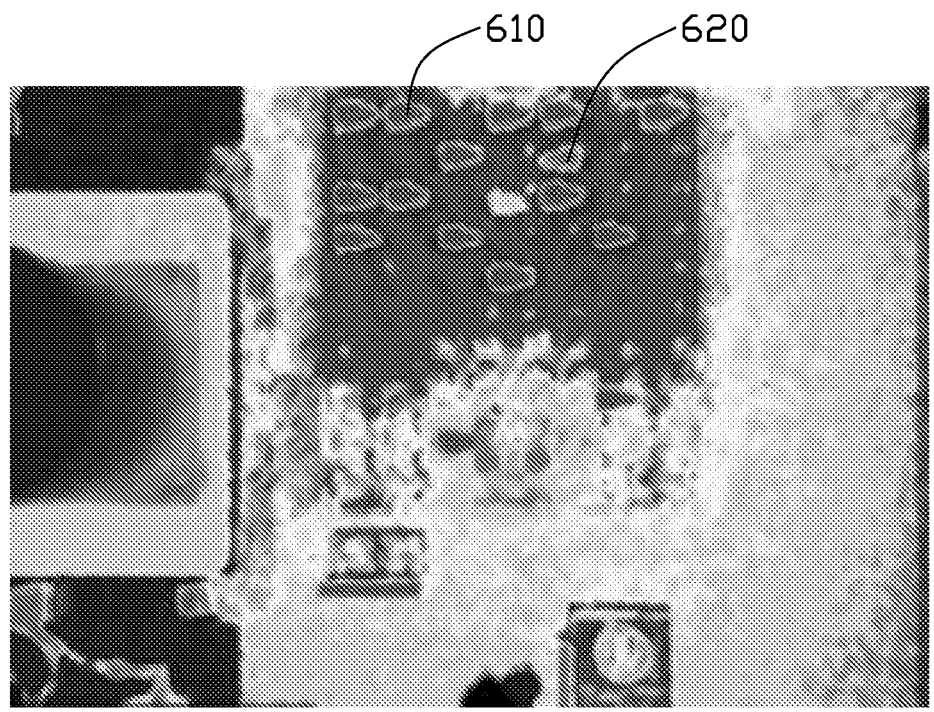
FIG. 5 is a three-dimensional image of an object according to another embodiment of the present disclosure.
Figure 6:
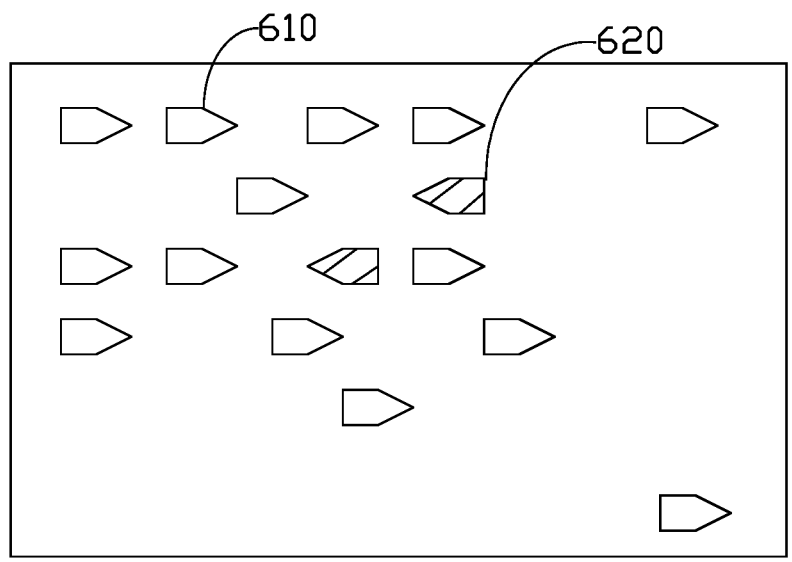
FIG. 6 is an image of objects after cutting according to an embodiment of the present disclosure.

FIG. 5 is a three-dimensional image of an object according to another embodiment of the present disclosure. FIG. 6 is an image of separated objects according to an embodiment of the present disclosure.

As shown in FIG. 5 and FIG. 6, when the tray 20 is transparent, the position and contour of the objects can be accurately identified by using the object identification system 10 provided in the embodiment of the present disclosure. The object identification system 10 can identify the coordinate value and Euler angle of the objects according to the position and contour of the objects, so that the mechanical arm 100 can adjust a grasping angle of each one of the plurality of objects 60 positioned in a same layer according to the coordinate value and Euler angle of the objects and achieve accurate grasping of the objects.

In the embodiment of present disclosure, the object identification system 10 can group the objects.

The first group objects 610 and the second group objects 620 are objects located in different layers of trays. Since the included angle of the placement of the objects between adjacent trays 20 is 180 degrees, the object identification system 10 can distinguish between and accurately identify the first group objects 610 and the second group objects 620. When controlling the mechanical arm 100 to grasp the objects, the object identification system 10 will not try to grasp the second group objects 620, avoiding error.

Figure 8:
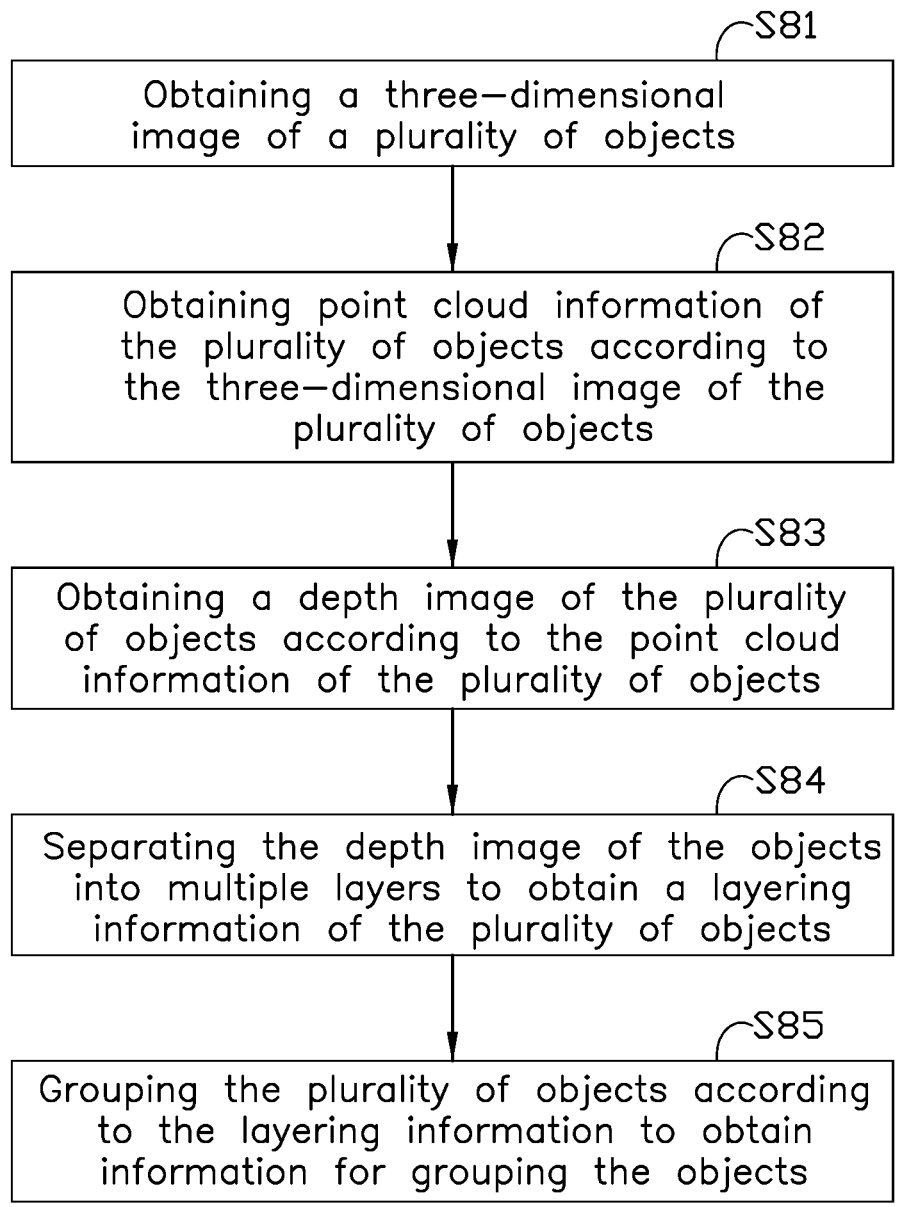
FIG. 8 is a flowchart of an object identification method according to an embodiment of the present disclosure.

FIG. 8 is a flowchart depicting an embodiment of an object identification method. The object identification method may be applied in the object identification system 10.

Each block shown in FIG. 8 represents one or more processes, methods, or subroutines, carried out in the example method. Furthermore, the illustrated order of blocks is illustrative only and the order of the blocks can change. Additional blocks can be added or fewer blocks may be utilized, without departing from the present disclosure. The example method can begin at block 81.

At block 81, obtaining a three-dimensional image of a plurality of objects.

In the embodiment of present disclosure, the point cloud computing module 300 can obtain the three-dimensional image of the objects from the three-dimensional camera 200. The three-dimensional image includes a reference photo, the reference photo is a three-dimensional image taken by the three-dimensional camera 200 parallel to the tray 20 containing the objects.

At block 82, obtaining point cloud information of the plurality of objects according to the three-dimensional image of the plurality of objects.

In the embodiment of present disclosure, the point cloud computing module 300 can obtain the point cloud information of the objects according to the reference photo. The point cloud information includes point cloud data, and the point cloud data includes the points of the object and its (x, y, Z, Rx, Ry, Rz) coordinates.

At block 83, obtaining a depth image of the plurality of objects according to the point cloud information of the plurality of objects.

In the embodiment of present disclosure, the depth image module 400 is used to obtain the depth image of the objects according to the point cloud information. The depth image module 400 sorts the (x, y, z) coordinate points of all the objects, selects the point closest to the three-dimensional camera 200, sets that point as the reference point, and sets the z-axis value of the reference point as $Z_1$. The depth image module 400 transmits the depth image of the objects and the information of the reference point to the grouping module 500.

At block 84, separating the depth image of the objects into multiple layers to obtain a layering information of the plurality of objects.

In the embodiment of present disclosure, the grouping module 500 is used to cut the depth image of the objects into multiple layers to obtain objects grouping. Specifically, the depth image module 400 first sets the depth D according to the thickness information of the tray 20. The grouping module 500 selects objects with z-axis value between [$Z_1$, $Z_1$+D] according to the depth image of the objects, the information of the reference point, and the depth D. The depth D can be set according to the thickness of the tray 20 and the placement rules of the objects. For example, the depth D can be set to 50 cm or 55 cm, but not limited thereto. The grouping module 500 obtains all objects with z-axis value between [$Z_1$, $Z_1$+D], and transmits the information of the objects to the mechanical arm 100.

At block 85, grouping the plurality of objects according to the layering information to obtain information for grouping the objects.

In the embodiment of present disclosure, the grouping module 500 is used to select the objects with the z-axis value between [$Z_1$, $Z_1$+D] according to the depth image of the objects, the information of the reference point, and the depth D, so as to achieve the grouping of the objects.

In the embodiment of present disclosure, the mechanical arm 100 is used for grasping the objects according to the objects grouping. The mechanical arm 100 grasp objects according to a sorting order. After all objects are taken out, the mechanical arm 100 can move the tray 20 aside to focus on the objects on the next layer of the tray 20 and drive the three-dimensional camera 200 to a position parallel to the objects, to start the next round of the object identification.

Those of ordinary skill in the art should realize that the above embodiments are only used to illustrate the present disclosure, but not to limit the present disclosure. As long as they are within the essential spirit of the present disclosure, the above embodiments are appropriately made and changes fall within the scope of protection of the present disclosure.

What is claimed is:

1. An object identification method comprising:
    obtaining point cloud information of a plurality of objects;
    obtaining a depth image of the plurality of objects according to the point cloud information of the plurality of objects;
    separating the depth image of the plurality of objects into multiple layers to obtain layer information of the plurality of objects;
    grouping the plurality of objects according to the layer information;
    obtaining grouping information of the plurality of objects;
    calculating a maximum plane of the plurality of objects;
    calculating a grasping point of the each one of the plurality of objects according to a normal vector of the maximum plane; and
    grasping the each one of the plurality of objects according to the grasping point of the each one of the plurality of objects.

2. The object identification method of claim 1, wherein the step of calculating a maximum plane of the plurality of objects comprises:
    obtaining the point cloud information of the plurality of objects positioned in a same layer;
    obtaining a plane with highest z-axis value according to the point cloud information of the plurality of objects; and
    setting the plane with the highest z-axis value as the maximum plane.

3. The object identification method of claim 1, wherein the maximum plane of the plurality of objects is calculated with the grouping information of the plurality of objects.

4. The object identification method of claim 1, wherein the point cloud information of the plurality of objects is obtained from a three-dimensional image.

5. The object identification method of claim 1, wherein an included angle of the plurality of objects positioned between adjacent layers is 180 degrees.

6. The object identification method of claim 1, wherein the plurality of objects positioned in a same layer are different type of objects.

7. The object identification method of claim 1, further comprising:
    getting a center point of the maximum plane and a Euler angle of the maximum plane; and
    adjusting a grasping angle of each one of the plurality of objects positioned in a same layer.

8. The object identification method of claim 1, further comprising:
    getting a center point of the each one of the plurality of objects and a Euler angle of the each one of the plurality of objects; and
    adjusting a grasping angle of each one of the plurality of objects positioned in a same layer.

9. The object identification method of claim 1, further comprising:
    obtaining a curvature value of the plurality of objects from the depth image of the plurality of objects; and
    identifying the plurality of objects according to the point cloud information, the grouping information, and the curvature value of the plurality of objects.

10. An object identification system comprising:
    a processor;
    a memory storing instructions that when executed by the processor cause the processor to perform operations comprising:
    obtaining point cloud information of the plurality of objects;
    obtaining a depth image of the plurality of objects according to the point cloud information of the plurality of objects;

separating the depth image of the plurality of objects into multiple layers to obtain layer information of the plurality of objects;

grouping the plurality of objects according to the layer information;

obtaining grouping information of the plurality of objects;

calculating a maximum plane of the plurality of objects;

calculating a grasping point of the each one of the plurality of objects according to a normal vector of the maximum plane; and grasping the each one of the plurality of objects according to the grasping point of the each one of the plurality of objects.

11. The object identification system of claim 10, wherein the operation of calculating a maximum plane of the plurality of objects comprises:

obtaining the point cloud information of the plurality of objects positioned in a same layer;

obtaining a plane with highest z-axis value according to the point cloud information of the plurality of objects; and setting the plane with the highest z-axis value as the maximum plane.

12. The object identification system of claim 10, wherein the maximum plane of the objects is calculated with the grouping information of the plurality of objects.

13. The object identification system of claim 10, further comprising a three-dimensional camera configured to obtain a three-dimensional image, wherein the point cloud information of the plurality of objects is obtained from the three-dimensional image.

14. The object identification system of claim 10, wherein an included angle of the plurality of objects between adjacent layers is 180 degrees.

15. The object identification system of claim 10, wherein the plurality of objects positioned in a same layer are different type of objects.

16. The object identification system of claim 10, wherein the instructions further cause the processor to:

get a center point of the maximum plane and a Euler angle of the maximum plane; and adjust a grasping angle of each one of the plurality of objects positioned in a same layer.

17. The object identification system of claim 10, wherein the instructions further cause the processor to:

get a center point of the each one of the plurality of objects and a Euler angle of the each one of the plurality of objects; and adjust a grasping angle of each one of the plurality of objects positioned in the same layer.

18. The object identification method of claim 10, wherein the instructions further cause the processor to:

obtain a curvature value of the plurality of objects from the depth image of the plurality of objects; and identify the plurality of objects according to the point cloud information, the grouping information, and the curvature value of the plurality of objects.

* * * * *